US010977087B2

(12) United States Patent
Horie et al.

(10) Patent No.: US 10,977,087 B2
(45) Date of Patent: Apr. 13, 2021

(54) STEAL ONE-PROCESS MANY WORK-STEALING

(71) Applicant: INTERNATIONAL BUSINESS MACHINES CORPORATION, Armonk, NY (US)

(72) Inventors: Michihiro Horie, Saitama (JP); Hiroshi Horii, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 16/057,309

(22) Filed: Aug. 7, 2018

(65) Prior Publication Data
US 2020/0050484 A1 Feb. 13, 2020

(51) Int. Cl.
G06F 9/46 (2006.01)
G06F 9/50 (2006.01)
G06F 9/48 (2006.01)
G06F 3/06 (2006.01)
G06F 12/02 (2006.01)

(52) U.S. Cl.
CPC ............ G06F 9/505 (2013.01); G06F 3/0604 (2013.01); G06F 3/0631 (2013.01); G06F 3/0673 (2013.01); G06F 9/4881 (2013.01); G06F 12/0253 (2013.01); G06F 2212/1044 (2013.01)

(58) Field of Classification Search
CPC ...... G06F 9/505; G06F 3/0604; G06F 3/0631; G06F 3/0673; G06F 9/4881; G06F 12/0253; G06F 2212/1044
See application file for complete search history.

(56) References Cited

U.S. PATENT DOCUMENTS

| 6,826,583 | B1 * | 11/2004 | Flood ................. G06F 12/0269 |
| 9,038,087 | B2 | 5/2015 | Ringseth et al. |
| 9,348,658 | B1 | 5/2016 | Robison et al. |
| 2003/0005025 | A1 * | 1/2003 | Shavit ................. G06F 9/4843 718/102 |
| 2004/0167945 | A1 * | 8/2004 | Garthwaite ......... G06F 12/0253 |
| 2009/0320027 | A1 * | 12/2009 | Ringseth ............. G06F 9/4881 718/102 |

(Continued)

OTHER PUBLICATIONS

Acar et al, Scheduling Parallel Programs by Work Stealing with Private Deques, ACM, 2013, 14 pages.*

(Continued)

*Primary Examiner* — Diem K Cao
(74) *Attorney, Agent, or Firm* — Tutunjian & Bitetto, P.C.; Randall Bluestone (57) ABSTRACT

A computer-implemented method, system, and computer program product are provided to reduce stealing in a processor. The method includes allocating a private space for a first thread in a memory. The method also includes generating a plurality of child tasks by the first thread responsive to processing a first task. The method additionally includes storing a portion of the plurality of child tasks in the private space removing the ability of other threads from popping the portion of the plurality of child tasks, with a remainder of the plurality of child tasks being stored in a public space. The method further includes popping the portion of the plurality of child tasks from the private space by the first thread.

20 Claims, 5 Drawing Sheets

(56) References Cited

U.S. PATENT DOCUMENTS

| | | | |
|---|---|---|---|
| 2012/0102501 A1* | 4/2012 | Waddington | G06F 9/5061 |
| | | | 718/105 |
| 2013/0091186 A1* | 4/2013 | Stephens | G06F 12/0253 |
| | | | 707/813 |
| 2014/0282595 A1* | 9/2014 | Lev | G06F 9/5083 |
| | | | 718/105 |
| 2016/0232035 A1 | 8/2016 | Lev et al. | |
| 2017/0322830 A1* | 11/2017 | Tamura | G06F 9/4806 |

OTHER PUBLICATIONS

Arora, "Thread Scheduling for Multiprogrammed Multiprocessors", Proceedings of the Tenth Annual ACM Symposium on Parallel Algorithms and Architectures, Jun. 28-Jul. 2, 1998, pp. 119-129.

Helin, "Improving Load Balancing During the Marking Phase of Garbage Collection", KTH, School of Computer Science and Communications Thesis, 2012, pp. 1-82.

Hendler, "Non-Blocking Steal-Half Work Queues", Proceedings of the Twenty-first Annual Symposium on Principles of Distributing Computing, Jul. 2002, pp. 280-289.

Van Dijk, "Lace:Non-Blocking Split Deque for Work-Stealing", Euro-Par 2014: Parallel Processing Workshops, Aug. 2014, pp. 206-217.

* cited by examiner

Allocate a private space in the memory for a first thread.
510

Generate a plurality of child tasks by the first thread responsive to processing a first task, including copying an object in the first task and modifying the object's reference and following the object's reference.
520

Store a portion of the plurality of child tasks in the private space removing the ability of other threads from popping the portion of the plurality of child tasks, with a remainder of the plurality of child tasks being stored in a public space.
530

Pop the portion of the plurality of child tasks from the private space by the first thread.
540

Pop the remainder of the plurality of child tasks by a second thread, with the second thread stealing the remainder of the plurality of child task from the first thread.
550

STEAL ONE-PROCESS MANY WORK-STEALING

BACKGROUND

Technical Field

The present invention generally relates to reducing work stealing, and more particularly to reducing work stealing in copying garbage collection (GC) processes.

Description of the Related Art

The open Java® development kit (OpenJDK) uses a work-stealing based process on the double-ended queue (deque) data structure described by Arora, Blumofe, and Plaxton (ABP), which is one of the most popular non-blocking algorithm for work-stealing. The ABP process copies the GC process to maintain the load balance. Each GC thread owns its queue to push and pop tasks. When all the tasks in a thread's queue are exhausted, the thread starts to steal tasks from other threads' queues.

SUMMARY

In accordance with an embodiment of the present invention, a computer-implemented method is provided to reduce work stealing. The method includes allocating a private space for a first thread in a memory. The method also includes generating a plurality of child tasks by the first thread responsive to processing a first task. The method additionally includes storing a portion of the plurality of child tasks in the private space removing the ability of other threads from popping the portion of the plurality of child tasks, with a remainder of the plurality of child tasks being stored in a public space. The method further includes popping the portion of the plurality of child tasks from the private space by the first thread.

In accordance with yet another embodiment, a non-transitory computer-readable storage medium comprising a computer-readable program for reducing work stealing is presented. The non-transitory computer readable storage medium having program instructions. The program instructions executable by a computer to cause the computer to perform a method. The method includes allocating a private space for a first thread in a memory. The method also includes generating a plurality of child tasks by the first thread responsive to processing a first task. The method additionally includes storing a portion of the plurality of child tasks in the private space removing the ability of other threads from popping the portion of the plurality of child tasks, with a remainder of the plurality of child tasks being stored in a public space. The method further includes popping the portion of the plurality of child tasks from the private space by the first thread.

In accordance with yet another embodiment, a system is provided to reduce work stealing in a processor. The system includes a memory and one or more processors, including one or more threads, in communication with the memory configured to allocate a private space in the memory for a first thread. The memory is further configured to generate a plurality of child tasks by the first thread responsive to processing a first task. The memory is additionally configured to store a portion of the plurality of child tasks in the private space removing the ability of other threads from popping the portion of the plurality of child tasks, with a remainder of the plurality of child tasks being stored in a public space. The memory is also configured to pop the portion of the plurality of child tasks from the private space by the first thread.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

Throughout the drawings, same or similar reference numerals represent the same or similar elements.

DETAILED DESCRIPTION

A Steal One-Process Many Work-Stealing process can be implemented for memory management or garbage collection (GC). The GC attempts to reclaim garbage, or memory occupied by objects that are no longer in use. The Steal One-Process Many Work-Stealing process can alter the processors utilization of threads and how the threads interact with each other as a GC process. Threads can utilize a double-ended queue (deque) for storing tasks. Deques can be split into multiple parts, including a private space and a public space, with a separator. A task can be processed by a thread in the work-stealing process by copying an object and modifying the objects reference. After processing the task, the thread creates child tasks from the processed task by following the references of the copied object. The child tasks are stored in the thread's deque. After storing the child tasks, the child tasks can be stolen by other thief threads.

A thread can push child tasks into the public side of the deque. A separator can cause movement between private and public space frequently to keep the load balanced in the deque by employing additional memory fences.

In one embodiment, the pushing of tasks can be adjusted to push part of the child tasks into the public space, and the rest of the child tasks can be pushed into the private space. Additionally, when N child tasks are stored in the private space, the last child tasks can be selected first.

In general, processes that own a part of the child tasks in a private space can cause the load imbalance, while a work-stealing mechanism can provide the load balance. Thus, the processes need to utilize an additional feature to maintain the load balance. A separator can be this additional feature to maintain a load balance. The separator can be moved frequently to keep the load balance with additional expensive memory fences. In one embodiment, child tasks can be pushed into different spaces without an additional memory fence for load balancing. The child tasks pushed into the private space cannot be stolen by thief threads, as the private space is only for the thread that set-up the private space. Adjusting the number of child tasks stored in the private space keeps the load balanced. The space allocated to the private space by the thread is configurable. The size of the private space can be configured responsive to the total available space. In one embodiment, the space can be allocated for example, as 40% for a public space with the remaining 60% divided by the number of threads for each thread's private space. In another embodiment, the space can be divided for example, evenly allocated between the threads, with each thread's space being evenly divided into a public space and a private space. In yet another embodiment, the space can be divided for example, into thirds, with a third being allocated for a public space, a third being allocated for a thread private space, and a third being allocated for a group private space. The thread private space being divided among the threads and the group private space being divided among the groups. The thread can store all child tasks in the private space until the allocated space is reached, then the thread can store child tasks in the public space. This balancing allows for the private space to maintain the same size, while reducing the chance of a thief thread stealing a child task from the thread.

Suppose that M child tasks are created and N of M tasks (N<M) are to be stored in the private space. An owner thread pushes (M−N) tasks into the public space first, then the owner thread pushes the remaining N tasks into the private space. Pushing tasks into the public space can increase the chance for the thief threads stealing the child tasks, and the time the owner thread is pushing the N tasks in the private space would be time for the thief threads to steal the tasks in the public space. However, in one embodiment, the owner thread pushes N tasks into the private space before pushing any tasks into the public space. This removes the possibility of the thief threads from stealing tasks in the public space during the time the owner thread is pushing tasks into the private space.

In one embodiment, the thread allocates the private space to include a preconfigured number of child tasks and then processes tasks to create child tasks. The thread can push child tasks into the private space, pulling tasks from the public space and the private space to process. The child tasks in the private space cannot be stolen by a thief thread as the space is not available to any thief threads. The preconfigured space allocated to the private space removes the necessity for expensive memory fences that would be employed if just a separator was utilized to separate the public space from the private space.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
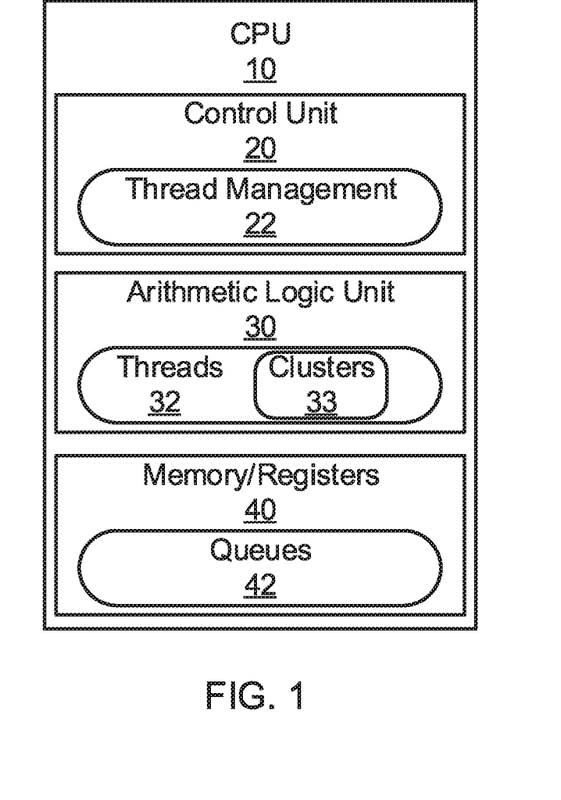
FIG. 1 is a block/flow diagram showing an exemplary processor device, in accordance with embodiments of the present invention.

Referring now to the drawings in which like numerals represent the same or similar elements and initially to FIG. 1, an exemplary processor device (CPU) 10, in accordance with embodiments of the present invention. The CPU 10 can be for example, e.g., a graphics processing unit (GPU), an application-specific instruction set processor (ASIP), a virtual processor (vCPU), a digital signal processor (DSP), an image processor, a physics processing unit (PPU), a central processing unit for a computer, server, tablet, internet-connected-device, or phone, etc.

In one embodiment, the CPU 10 can include a control unit 20, an arithmetic logic unit 30, and a memory/register (hereinafter "memory") 40. The control unit 20 of the CPU 10 controls the CPU 10 and the what instructions are processed by the CPU 10. The control unit 20 can include a thread management process 22. The thread management process 22 can include rules for handling memory 40 occupied by objects that are no longer in use by any threads 32. The thread management process 22 can manage the threads 32 and any memory 40 locations utilized by the threads 32. Management of the threads 32 can include grouping threads 32 together to form thread clusters 33. The thread clusters 33 can be employed to accomplish larger processes together.

The arithmetic logic unit 30 can include threads 32. The threads 32 can process the tasks that are run on the CPU 10. The threads 32 can be grouped into thread clusters 33 by a thread management process 22 or by the arithmetic logic unit 30. Threads 32 or thread clusters 33 can pop a task from memory 40 and the task by copying an object from the task and the modifying the objects reference. After processing the task, the threads 32 or thread clusters 33 create child tasks from the processed task by following the references of the copied object. The threads 32 or thread clusters 33 push the child tasks created into the memory 40. The threads 32 or thread clusters 33 pop the next task from processing after pushing all the child tasks created into the memory 40.

The memory 40 can different sections including queues 42. The queues 42 can be divided into different sections that can be accessed by different threads 32 or thread clusters 33.

Figure 2:
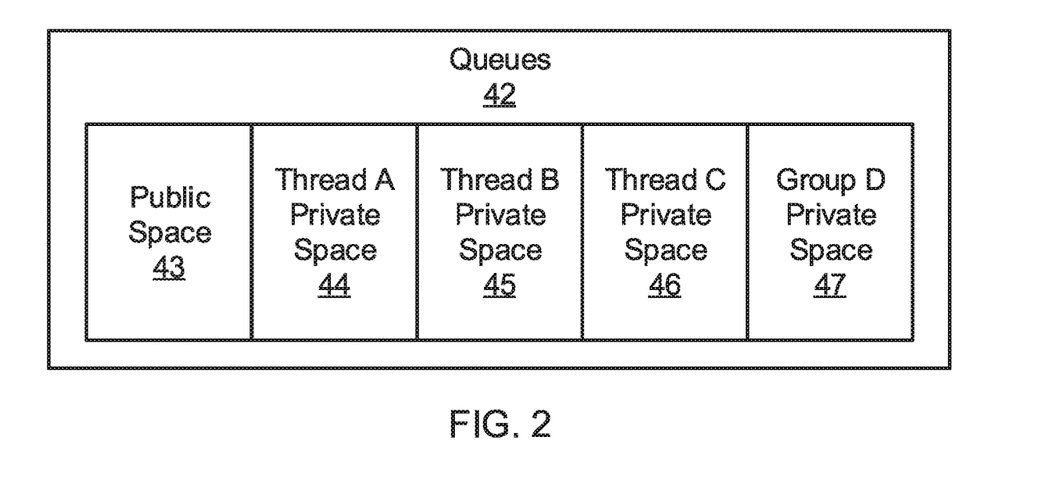
FIG. 2 is a block/flow diagram showing queues in the memory of FIG. 2, in accordance with embodiments of the present invention.

FIG. 2 is a block/flow diagram showing queues 42 in a memory 40 of FIG. 2, in accordance with embodiments of the present invention. The queues 42 can be divided into different sections for varying purposes. The queues 42 can be divided by the control unit 20, the thread management process 22, threads 32, or the arithmetic logic unit 30. The size of the spaces in the queues 42 can be adjustable and configurable based on the needs of the CPU 10 or the needs of a process the CPU 10 is processing. The queues 42 can include a public space 43. The public space 43 in the queues 42 can be accessed by all of the threads 32 of the CPU 10. Every thread in the arithmetic logic unit 30 can access the tasks stored in the public space 43. The tasks stored in the public space 43 can be processed by any thread and this permits tasks to be stolen by threads that did not create the tasks.

The queues 42 can include private spaces. The private spaces can be assigned to a specific thread, e.g., thread A private space 44, thread B private space 45, or thread C private space 46. The private spaces can also be assigned to thread clusters 33, e.g., group D private space 47. If thread A processes a task and creates M child tasks. N of the M child tasks (N<M) are to be stored in the thread A private space 44 with the remainder, M–N, of the child tasks to be stored in the public space 43. The thread A pushes (M–N) tasks into the public space 43 first, then the thread A pushes the remaining N child tasks into the thread A private space 44. Other threads, e.g., thread B or thread C, can steal the M–N child tasks stored in the public space 43 while the thread A is pushing the remaining N child tasks into the thread A private space 44. This permits the child tasks created by the thread A to be stolen by other threads before thread A can even start to process the child tasks.

In one embodiment, the thread A processes a task and creates Q child tasks. P of the child tasks created can be stored in the thread A private space 43, with the remainder, Q–P, child tasks being stored in the public space 43. The thread A can push P child tasks into the thread A private space, then thread A can push the remainder, Q–P, of the child tasks into the public space 43. This shifting of the first storage location from the public space 43 to the thread A private space 44 will keep any other threads from stealing the child tasks from the public space while the thread A is pushing child tasks into the thread A private space. This adjustment will improve the CPU by reducing the pause time for the thread A looking for tasks to process by about 3% or more. This improvement is achieved by the thread A processing child tasks it created instead of having to steal child tasks from other threads.

In another embodiment, the thread A processes a task and creates S child tasks. R of the child tasks created can be stored in the thread A private space 43, with the remainder, S–R, child tasks being stored in the group D private space 47. The use of the group D private space 47 is achieved with thread A being a member of Group D. Other threads can be members of group D, e.g., thread C. This would permit either thread A or thread C to push and pull tasks from the group D private space 47. The thread A can push R child tasks into the thread A private space, then thread A can push the remainder, S–R, of the child tasks into the group D private space 43. This will keep the child tasks created by thread A from being pulled by any thread, e.g., thread B, outside the group D, and keep members of group D, e.g., thread C, from pulling any of the S–R child tasks in the group D private space 47 until after thread A has pushed R child tasks into the thread A private space.

Figure 3:
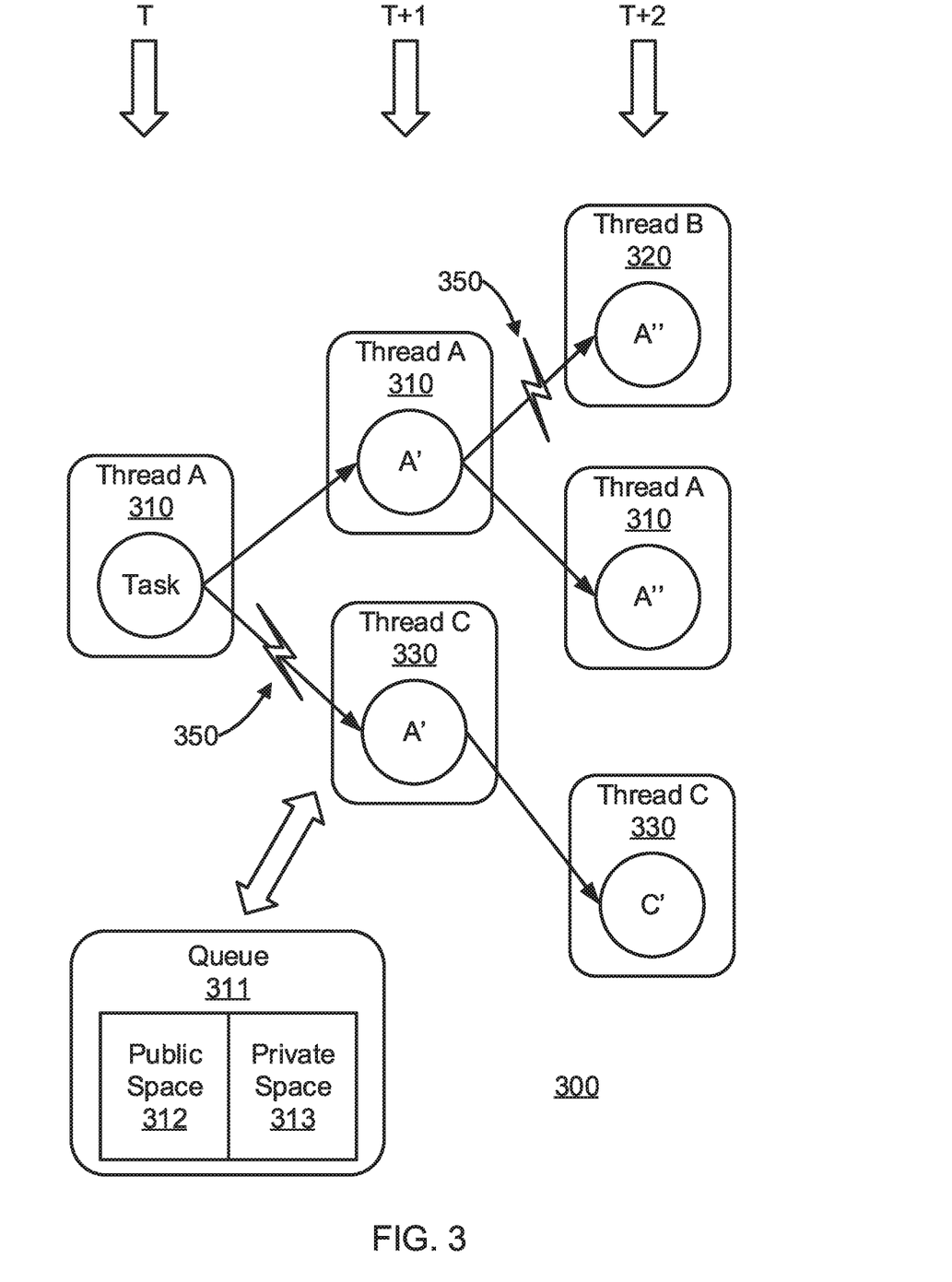
FIG. 3 is a block/flow diagram showing a processor device with threads processing tasks over time, in accordance with embodiments of the present invention.

FIG. 3 is a block/flow diagram showing a processor device 300 with threads processing tasks over time, in accordance with embodiments of the present invention. The processor device 300 can include one or more threads for processing tasks. A task can be processed in by copying an object and modifying the objects reference. After processing a task, a thread creates child tasks from the finished task by following the references of the copied object. The processor device 300 can be configured to utilizing a steal one-process many work-stealing process to reduce the amount of child task stealing in the processor device 300.

In one embodiment, the processor device 300 includes thread A 310, thread B 320, and thread C 330. At time T, thread A 310 can process a task pulled from a queue 311 to create child tasks, A'. The queue 311 can include public spaces 312 and private spaces 313 for the threads in the processor device 300. Thread A can push all the created child task, A', into the queue 311.

At time T+1, the threads pull the child tasks, A', from the queue 311 for processing. The thread A 310 pulls a child task, A', from the queue 311 for processing and created child tasks, A". The thread A can then push the child tasks, A", into the queue 311. Another child task, A', can be pulled from the queue 311 by thread C 330. The thread C 330 stole 350 the child task, A', from the thread A. The thread C 330 can generate child tasks, C', and push the child tasks, C', into the queue 311.

At time T+2, the threads pull the child tasks, A" and C', from the queue 311 for processing. The thread A 310 pulls a child task, A", from the queue 311 for processing and created child tasks, A'''. The thread A can then push the child tasks, A''', into the queue 311. Another child task, A", can be pulled from the queue 311 by thread B 320. The thread B 320 stole 350 the child task, A", from the thread A. The thread B 320 can generate child tasks, B', and push the child tasks, B', into the queue 311. The thread C 330 pulls a child task, C', from the queue 311 for processing and created child tasks, C". The thread C can then push the child tasks, C", into the queue 311. The processor device 300 that utilizes a thread management process to reduce work stealing by about 40% or more. This reduction in work stealing can improve the processor device 300 by reducing the pause time for the threads looking for tasks to process by about 3% or more. This improvement is achieved by the threads processing child tasks that the threads created instead of having to steal child tasks from other threads.

Figure 4:
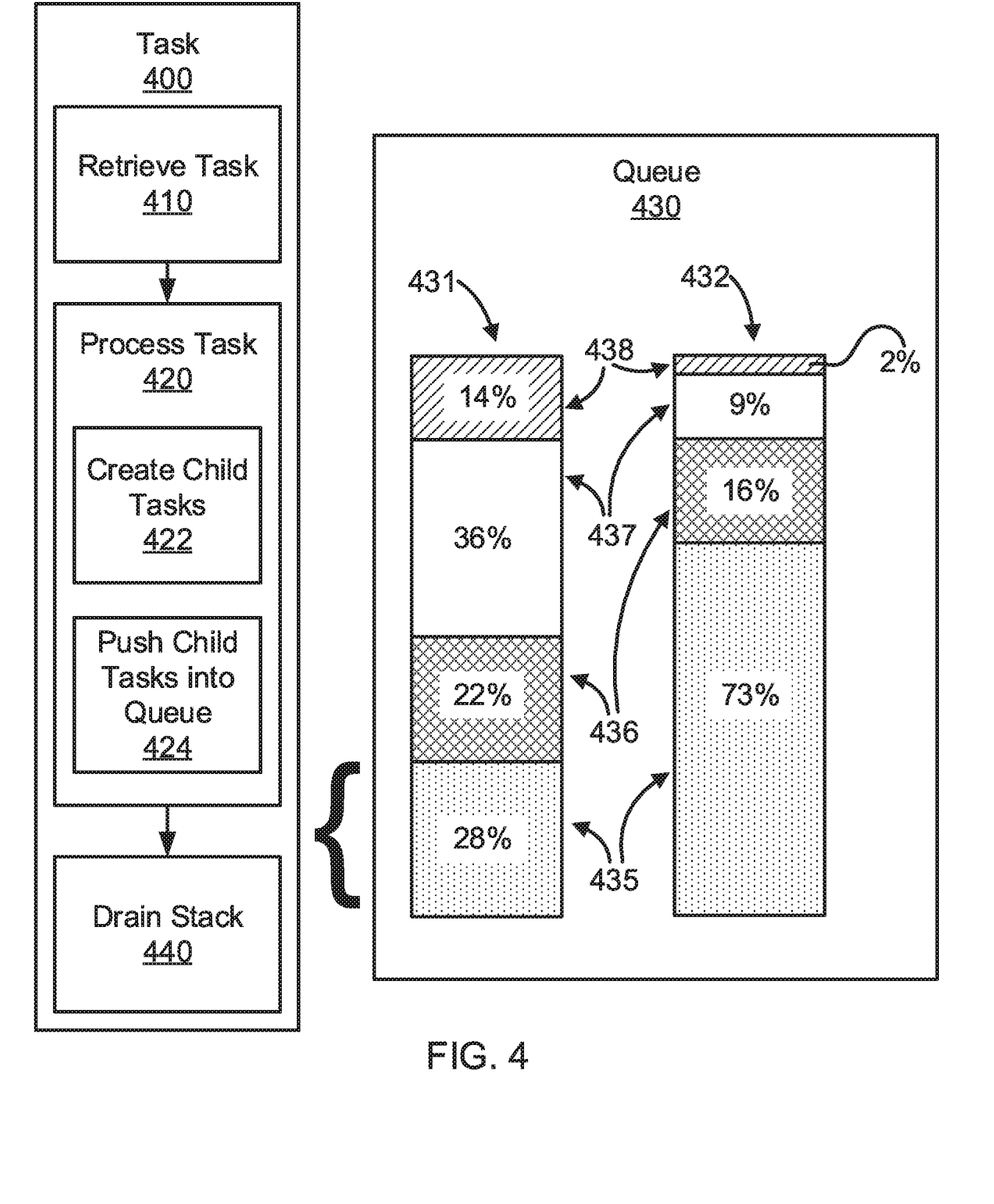
FIG. 4 is a block/flow diagram showing a thread for processing tasks with queue usage, in accordance with embodiments of the present invention.

FIG. 4 is a block/flow diagram showing a task processing method 400 with queue 430 usage, in accordance with embodiments of the present invention. In block 410, a thread retrieves tasks from the queue 430 for processing. In block 420, the thread can process the tasks by copying an object from the tasks and modifying the objects reference. In block 422, the thread creates child tasks from the processed tasks by following the references of the copied object. The tasks processed can each create multiple child tasks. The thread can create no child tasks, one child task, two child tasks, or three or more child tasks. In block 424, the thread pushed the child tasks into the queue 430. In block 440, the thread drains the queue 430 of child tasks pushed into the queue 430 during block 424. The capacity of the queue 430 can change from capacity 431 to capacity 432 in the time the thread takes to go from block 424 to block 440 by other threads stealing the child tasks pushed in the queue 430.

The queue 430 can have the child tasks from multiple processed tasks pushed into it in block 424. The capacity 431 after block 424 can include empty space 435 with no child tasks, space with one child task 436, space with two child tasks 437 and space with three or more child tasks 438. The empty space 435 in the queue 430 after block 424 can be about 28%. This can happen when a processed task creates no child tasks. The space with one child task 436 can be about 22%. The space with two child tasks 437 can be about 36% and the space with three or more child tasks can be about 14%. The capacity 431 can include about 130 or more child tasks. The percentages and number of child tasks are an example and other percentages and number of child tasks are envisioned in the present invention.

The capacity 432 before block 440 can include empty space 435, space with one child task 436, space with two child tasks 437, and space with three or more child tasks 438. In the time between block 424 and block 440, the empty space 435 can go from about 28% to about 73%. This can be an increase in the empty space 435 in the queue 430 by about 45%, which translates to a significant loss of child tasks to be processed by the thread. The space with one child task 436 can go from about 22% to about 16%. This is a decrease of the space with one child tasks 436 in the queue 430 of about 6%. The capacity 432 used by the space with one child tasks 436 can be originally from the space with one child tasks 436 or it can be space formerly utilized as the space with two child tasks 437 or the space with three or more child tasks 438. The space with two child tasks and the space with three or more child tasks shrink as child tasks are stolen by other threads.

The space with two child tasks 437 can go from about 36% to about 9%. This is a decrease of the space with two child tasks 437 in the queue 430 of about 25%. The capacity 432 used by the space with two child tasks 437 can be originally from the space with two child tasks 437 or it can be from the space with three or more child tasks 438. The space with three or more child tasks shrink as child tasks are stolen by other threads. The space with three or more child tasks 438 can go from about 14% to about 2%. This is a decrease of the space with three or more child tasks 438 in the queue 430 of about 12%. The capacity 432 of the queue 430 can be about 40 or more child tasks. This is a loss of about 90 or more child tasks in the time a thread takes to go from pushing child tasks into the queue 430 to pulling the child tasks from the queue 430. The loss of the child tasks from the queue 430 can cause the thread to pause while searching for tasks to process. A thread management process can reduce the tasks stealing and reduce the thread pause by about 3% for an improvement in the processing device.

Figure 5:
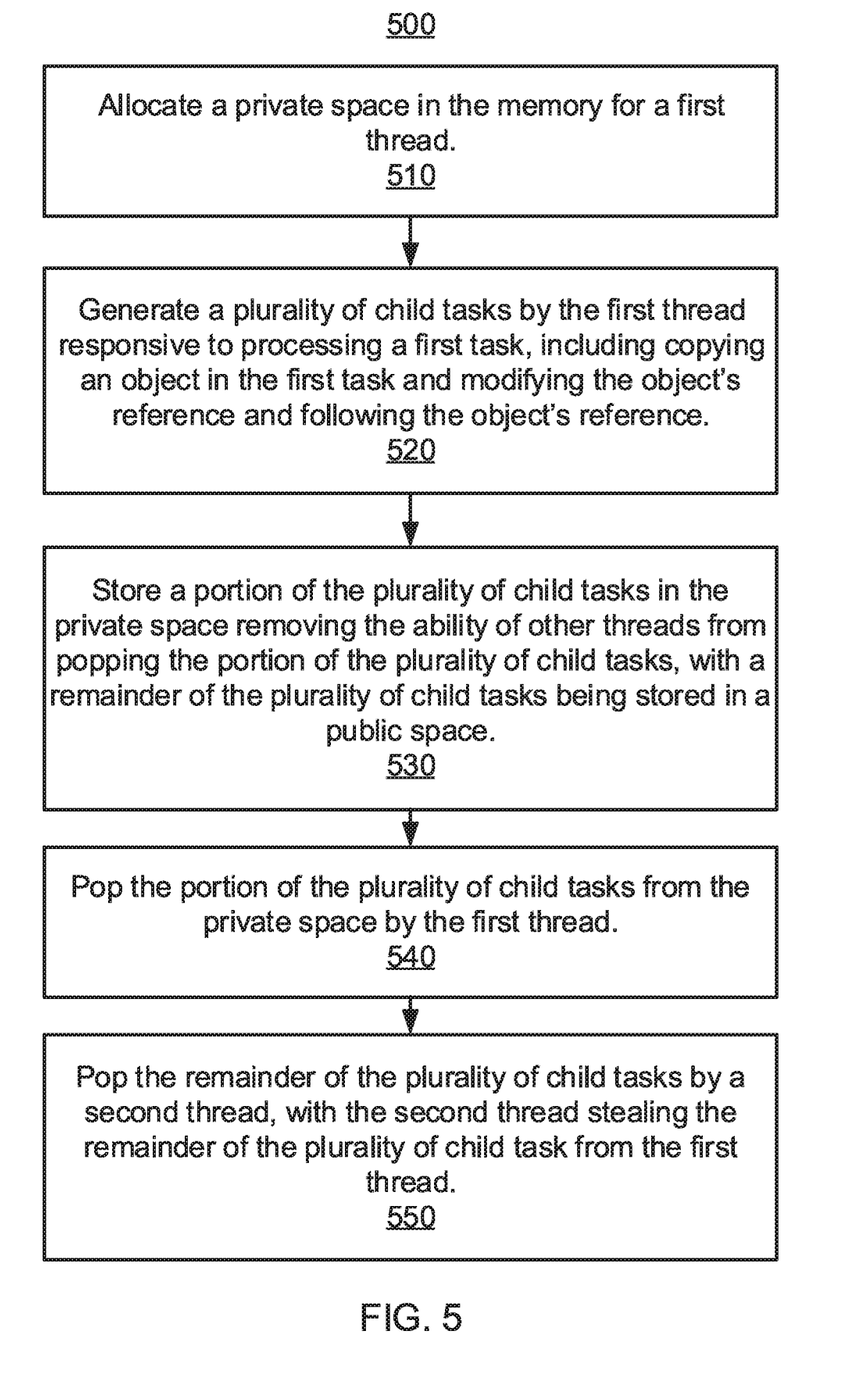
FIG. 5 is a block/flow diagram illustrating a method for thread management, in accordance with embodiments of the present invention.

FIG. 5 is a block/flow diagram illustrating a method 500 for reducing work stealing, in accordance with an embodiment of the present invention. In block 510, allocate a private space in the memory for a first thread. In block 520, generate a plurality of child tasks by the first thread responsive to processing a first task, including copying an object in the first task and modifying the object's reference and following the object's reference. In block 530, store a portion of the plurality of child tasks in the private space removing the ability of other threads from popping the portion of the plurality of child tasks, with a remainder of the plurality of child tasks being stored in a public space. In block 540, pop the portion of the plurality of child tasks from the private space by the first thread. In block 550, pop the remainder of the plurality of child tasks by a second thread, with the second thread stealing the remainder of the plurality of child task from the first thread.

Figure 6:
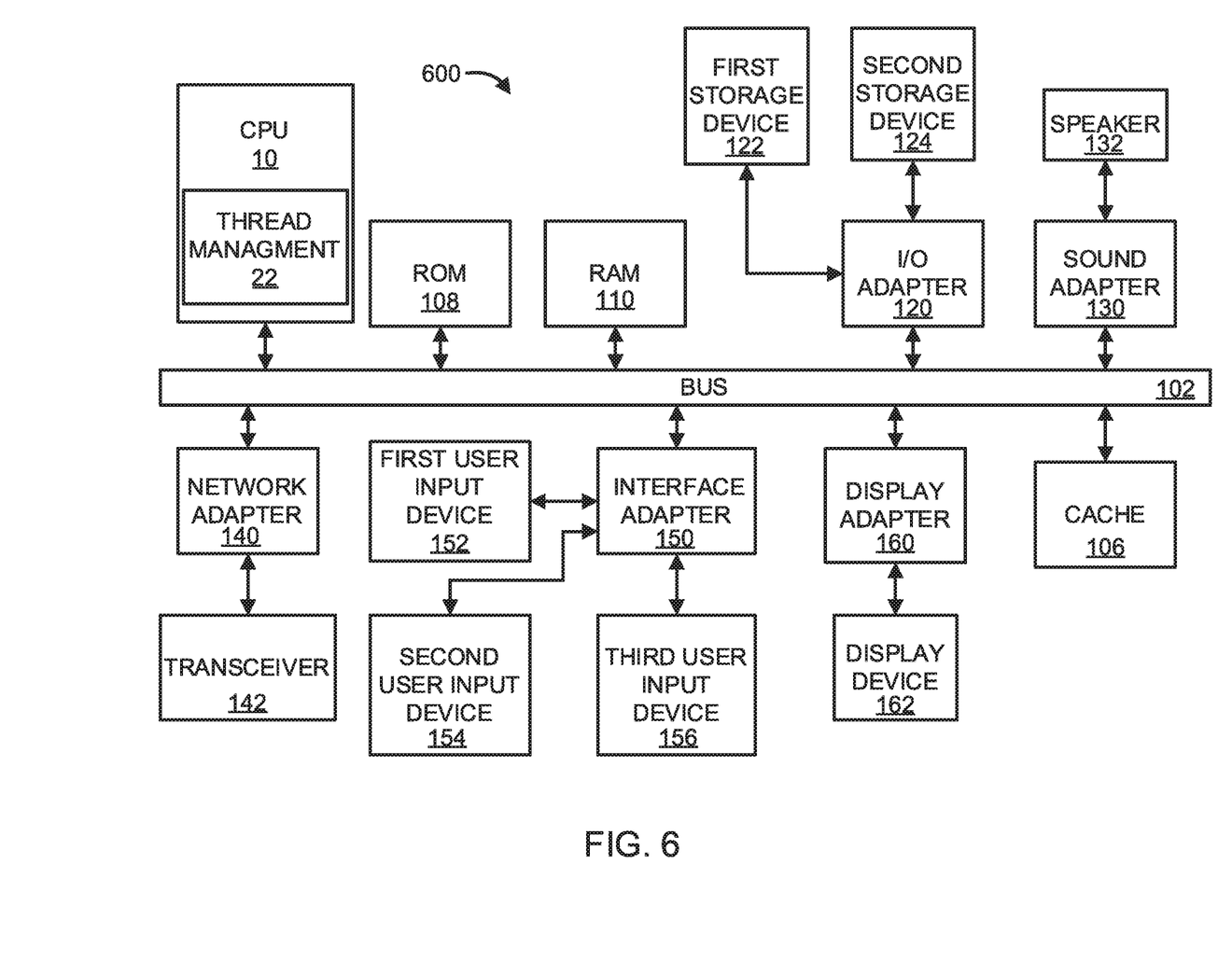
FIG. 6 is a block/flow diagram showing an exemplary processing system, in accordance with embodiments of the present invention.

FIG. 6 is a block/flow diagram illustrating an exemplary processing system 600 to which aspects of the present invention may be applied is shown in accordance with one embodiment. The processing system 600 includes at least one CPU 10 operatively coupled to other components via a system bus 102. The CPU 10 can utilize the thread management 105 as described above to increase the efficiency and performance of the processor by better managing thread utilization and memory management. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor to reduce work stealing, the computer-implemented method comprising:
   allocating a private space for a first thread in a memory which excludes other threads;
   generating a plurality of child tasks by the first thread responsive to processing a first task;
   storing a portion of the plurality of child tasks in the private space removing the ability of other threads from popping the portion of the plurality of child tasks to reduce the work stealing, with a remainder of the plurality of child tasks being stored in a public space in the memory to enable the working stealing; and
   popping the portion of the plurality of child tasks from the private space by the first thread,
   wherein the public space can be populated by any of a plurality of threads including the first thread and other threads.

2. The computer-implemented method of claim 1, wherein the first thread steals the first task.

3. The computer-implemented method of claim 1, wherein generating includes copying an object in the first task and modifying the object's reference.

4. The computer-implemented method of claim 3, wherein generating further includes following the object's references.

5. The computer-implemented method of claim 1, further comprising popping, by the first thread, a portion of the memory supporting the remainder of the plurality of child tasks.

6. The computer-implemented method of claim 1, further comprising popping, by a second thread, a portion of the memory supporting the remainder of the plurality of child tasks.

7. The computer-implemented method of claim 6, wherein the second thread steals the remainder of the plurality of child tasks from the first thread.

8. The computer-implemented method of claim 1, wherein allocating allocates the private space to include a pre-determined size.

9. The computer-implemented method of claim 8, wherein the pre-determined size is adjustable.

10. A non-transitory computer-readable storage medium comprising a computer-readable program executed on a processor in a data processing system to reduce work stealing, wherein the computer-readable program when executed on the processor causes a computer to perform the steps of:
    allocating a private space for a first thread in a memory which excludes other threads;
    generating a plurality of child tasks by the first thread responsive to processing a first task;
    storing a portion of the plurality of child tasks in the private space removing the ability of other threads from popping the portion of the plurality of child tasks to reduce the work stealing, with a remainder of the plurality of child tasks being stored in a public space in the memory to enable the working stealing; and
    popping the portion of the plurality of child tasks from the private space by the first thread,
    wherein the public space can be populated by any of a plurality of threads including the first thread and other threads.

11. The non-transitory computer-readable storage medium of claim 10, wherein the first thread steals the first task.

12. The non-transitory computer-readable storage medium of claim 10, wherein generating includes copying an object in the first task and modifying the object's reference.

13. The non-transitory computer-readable storage medium of claim 12, wherein generating further includes following the object's references.

14. The non-transitory computer-readable storage medium of claim 10, further comprising popping, by the first thread, a portion of the memory supporting the remainder of the plurality of child tasks.

15. The non-transitory computer-readable storage medium of claim 10, further comprising popping, by a second thread, a portion of the memory supporting the remainder of the plurality of child tasks.

16. The non-transitory computer-readable storage medium of claim 15, wherein the second thread steals the remainder of the plurality of child tasks from the first thread.

17. A system for reducing work stealing in a processor, the system comprising:
    a memory; and
    one or more processors, including one or more threads, in communication with the memory configured to:
       allocate a private space in the memory for a first thread which excludes other threads;
       generate a plurality of child tasks by the first thread responsive to processing a first task;
       store a portion of the plurality of child tasks in the private space removing the ability of other threads from popping the portion of the plurality of child tasks to reduce the work stealing, with a remainder of the plurality of child tasks being stored in a public space in the memory to enable the working stealing; and
       pop the portion of the plurality of child tasks from the private space by the first thread,
       wherein the public space can be populated by any of a plurality of threads including the first thread and other threads.

18. The system of claim 17, wherein the first thread stole the first task.

19. The system of claim 17, wherein the memory is further configured to copy an object in the first task and modify the object's reference.

20. The system of claim 17, wherein the memory is further configured to follow the object's references.

* * * * *